US009443484B2

(12) United States Patent
Suyama et al.

(10) Patent No.: US 9,443,484 B2
(45) Date of Patent: Sep. 13, 2016

(54) LIQUID CRYSTAL DISPLAY DEVICE AND METHOD FOR DRIVING SAME

(71) Applicant: Sharp Kabushiki Kaisha, Osaka-shi, Osaka (JP)

(72) Inventors: Tatsuhiko Suyama, Osaka (JP); Kouji Kumada, Osaka (JP); Norio Ohmura, Osaka (JP); Noriyuki Tanaka, Osaka (JP); Takuya Sone, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 21 days.

(21) Appl. No.: 14/438,997

(22) PCT Filed: Nov. 13, 2013

(86) PCT No.: PCT/JP2013/080627
§ 371 (c)(1),
(2) Date: Apr. 28, 2015

(87) PCT Pub. No.: WO2014/080811
PCT Pub. Date: May 30, 2014

(65) Prior Publication Data

US 2015/0255028 A1 Sep. 10, 2015

(30) Foreign Application Priority Data

Nov. 20, 2012 (JP) ................................ 2012-254456

(51) Int. Cl.
*G06F 3/044* (2006.01)
*G09G 5/00* (2006.01)
(Continued)

(52) U.S. Cl.
CPC .......... *G09G 3/3618* (2013.01); *G09G 3/3611* (2013.01); *G09G 3/3614* (2013.01); *G09G3/3677* (2013.01); *G09G 3/3696* (2013.01); *G09G 3/3648* (2013.01); *G09G 2310/0208* (2013.01); *G09G 2310/08* (2013.01); *G09G 2320/0247* (2013.01); *G09G 2320/103* (2013.01); *G09G 2340/0435* (2013.01)

(58) Field of Classification Search
CPC ..... G06F 3/044; G06F 1/3218; G09G 5/003; G09G 3/3614; H04N 5/23216
See application file for complete search history.

(56) References Cited

U.S. PATENT DOCUMENTS 8,830,155 B2 * 9/2014 Hsu ..................... G09G 3/3614 345/100
2004/0021625 A1 2/2004 Lee
(Continued)

FOREIGN PATENT DOCUMENTS

JP 2000-221923 A 8/2000
JP 2003-337577 A 11/2003
(Continued)

OTHER PUBLICATIONS

Official Communication issued in International Patent Application No. PCT/JP2013/080627, mailed on Feb. 10, 2014.

*Primary Examiner* — Lin Li
(74) *Attorney, Agent, or Firm* — Keating & Bennett, LLP

(57) ABSTRACT

In a liquid crystal display device for performing pause driving, occurrence of flicker is effectively suppressed while an increase in power consumption is suppressed. A frame in which an image signal is inputted without requesting an external portion to input the image signal is set as a refresh frame by a reversal driving technique deciding portion. A pause frame counting portion counts the number of times of pause frames since the previous refresh frame as a count value. The comparison portion compares the count value with a previously set threshold. As a result, when the count value is not smaller than the threshold, the reversal driving technique deciding portion sets a reversal driving technique in the first input frame to dot-reversal driving. When the count value is smaller than the threshold, the reversal driving technique deciding portion sets a reversal driving technique in the first input frame to column-reversal driving.

14 Claims, 14 Drawing Sheets

(51) Int. Cl.
*G06F 1/32* (2006.01)
*G09G 3/36* (2006.01)
*H04N 5/232* (2006.01)

(56) References Cited

U.S. PATENT DOCUMENTS

2004/0036669 A1* 2/2004 Yanagi .................. G06F 1/3218 345/98
2009/0322969 A1* 12/2009 Unger .................... G09G 5/003 348/790
2010/0149156 A1* 6/2010 Maki .................... G09G 3/3614 345/211
2013/0057511 A1* 3/2013 Shepelev ................ G06F 3/044 345/174
2013/0222671 A1* 8/2013 Tseng ................. H04N 5/23216 348/333.11

FOREIGN PATENT DOCUMENTS

JP 2005-215591 A 8/2005
JP 2010-139775 A 6/2010

* cited by examiner

Fig.3

| Frame | 0 | 1 | 2 | 3 | 4 | 5 | 6 | 7 | 8 | 9 |
|---|---|---|---|---|---|---|---|---|---|---|
| DATA | A | | | | | | | | | A |
| REF/NREF | R | N | N | N | N | N | N | N | N | R |
| Driving | D | | | | | | | | | D |

Fig.4

| Frame | 0 | 1 | 2 | 3 | 4 | 5 | 6 | 7 |
|---|---|---|---|---|---|---|---|---|
| DATA | A | | | | | | | B |
| REF/NREF | R | N | N | N | N | N | N | R |
| Driving | D | | | | | | | D |

Fig.5

| Frame | 0 | 1 | 2 | 3 | 4 | 5 | 6 |
|---|---|---|---|---|---|---|---|
| DATA | A | | | | | | A |
| REF/NREF | R | N | N | N | N | N | R |
| Driving | D | | | | | | C |

Fig.6

| Frame | 0 | 1 | 2 | 3 |
|---|---|---|---|---|
| DATA | A | | | B |
| REF/NREF | R | N | N | R |
| Driving | D | | | C |

Fig.7

| Frame | 0 | 1 | 2 | 3 | 4 | 5 | 6 | 7 | 8 | 9 | 10 |
|---|---|---|---|---|---|---|---|---|---|---|---|
| REQOUT | | | | | | | | | | RO | |
| DATA | A | | | | | | | | | | A |
| REF/NREF | R | N | N | N | N | N | N | N | N | N | R |
| Driving | D | | | | | | | | | | D |

Fig.8

| Frame | 0 | 1 | 2 | 3 | 4 | 5 | 6 | 7 |
|---|---|---|---|---|---|---|---|---|
| REQOUT | | | | RO | RO | | | |
| DATA | A | | | | A | A | | |
| REF/NREF | R | N | N | N | R | R | N | N |
| Driving | C | | | | D | D | | |

Fig.9

| Frame | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| REQOUT | | | | | | | | | | | RO | RO | | | |
| DATA | A | | | | | | | B | | | | B | B | | |
| REF/NREF | R | N | N | N | N | N | N | R | N | N | N | R | R | N | N |
| Driving | D | | | | | | | D | | | | D | D | | |

Fig.10

| Frame | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| REQOUT | | | | | | | | | | | | | | | |
| DATA | A | | | | | | | A | | | | | | | |
| REF/NREF | R | N | N | N | N | N | N | R | N | N | N | N | N | N | N |
| Driving | D | | | | | | | D | | | | | | | |

Fig.11

| Frame | 0 | 1 | 2 | 3 | 4 | 5 | 6 | 7 | 8 | 9 |
|---|---|---|---|---|---|---|---|---|---|---|
| REQOUT | | | | | | RO | RO | | | |
| DATA | A | | A | | | | A | A | | |
| REF/NREF | R | N | R | N | N | N | R | R | N | N |
| Driving | C | | C | | | | D | D | | |

Fig.12

| Frame | 0 | 1 | 2 | 3 | 4 | 5 | 6 | 7 | 8 | 9 |
|---|---|---|---|---|---|---|---|---|---|---|
| REQOUT | | | | | RO | RO | | | | |
| DATA | A | A | | | | A | A | | | |
| REF/NREF | R | R | N | N | N | R | R | N | N | N |
| Driving | C | C | | | | D | D | | | |

Fig.13

| Frame | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| REQOUT | | | | RO | RO | | | | | | | RO | RO | | | | | | | | | | RO | RO | | | | | | |
| DATA | A | | | | A | A | | | A | | | | A | A | | | | | | A | | | | A | A | | | | | |
| REF/NREF | R | N | N | N | R | R | N | N | R | N | N | N | R | R | N | N | N | N | N | R | N | N | N | R | R | N | N | N | N | N |
| Driving | C | | | | D | D | | | C | | | | D | D | | | | | | C | | | | D | D | | | | | |
| VCOM | VCOM2 | | | | VCOM1 | | | | VCOM2 | | | | VCOM1 | | | | | | | VCOM2 | | | | VCOM1 | | | | | | |
| NREF_Cnt | | 1 | 2 | 3 | | | 1 | 2 | | 1 | 2 | 3 | | | 1 | 2 | 3 | 4 | 5 | | 1 | 2 | 3 | | | 1 | 2 | 3 | 4 | 5 |
| REF_Cnt | 1 | | | | 2 | 3 | | | 1 | | | | 2 | 3 | | | | | | 1 | | | | 2 | 3 | | | | | |

| Frame | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|---|---|---|---|---|---|---|---|---|---|---|
| REQOUT | | | | | | | | | | | | RO | RO | | | | | | RO | RO | | | | | | | | | | RO |
| DATA | | A | | | | | | | B | | | | B | B | | C | | | | C | C | | | | | | | | | |
| REF/NREF | N | R | N | N | N | N | N | N | R | N | N | N | R | R | N | R | N | N | N | R | R | N | N | N | N | N | N | N | N | N |
| Driving | | D | | | | | | | D | | | | D | D | | C | | | | D | D | | | | | | | | | |
| VCOM | | VCOM1 | | | | | | | | | | | | | | VCOM2 | | | | VCOM1 | | | | | | | | | | |
| NREF_Cnt | 6 | | 1 | 2 | 3 | 4 | 5 | 6 | | 1 | 2 | 3 | | | 1 | | 1 | 2 | 3 | | | 1 | 2 | 3 | 4 | 5 | 6 | 7 | 8 | 9 |
| REF_Cnt | | 1 | | | | | | | 1 | | | | 2 | 3 | | 1 | | | | 2 | 3 | | | | | | | | | |

Fig.14

| Frame | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| REQOUT | | | | | | | | | RO | RO | | | | | | | | | RO | RO | | | | | | | | | | |
| DATA | A | | A | | | A | | | | A | A | | | | | B | | | | B | B | | | | | | | B | | |
| REF/NREF | R | N | R | N | N | R | N | N | N | R | R | N | N | N | N | R | N | N | N | R | R | N | N | N | N | N | N | R | N | N |
| Driving | C | | C | | | C | | | | D | D | | | | | C | | | | D | D | | | | | | | D | | |
| VCOM | VCOM2 | | | | | | | | | VCOM1 | | | | | | VCOM2 | | | | VCOM1 | | | | | | | | | | |
| NREF_Cnt | | 1 | | 2 | 3 | | 1 | 2 | 3 | | | 1 | 2 | 3 | 4 | | 1 | 2 | 3 | | | 1 | 2 | 3 | 4 | 5 | 6 | | 1 | 2 |
| REF_Cnt | 1 | | 1 | | | 1 | | | | 2 | 3 | | | | | 1 | | | | 2 | 3 | | | | | | | 1 | | |

| Frame | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|---|---|---|---|---|---|---|---|---|---|---|
| REQOUT | | | | | | | RO | | | | RO | RO | | | | | | | | RO | RO | | | | | | | | | |
| DATA | | | | | | | | C | | | | C | C | | | | D | | | | D | D | | | | | | | | |
| REF/NREF | N | N | N | N | N | N | N | R | N | N | N | R | R | N | N | N | R | N | N | N | R | R | N | N | N | N | N | N | N | N |
| Driving | | | | | | | | D | | | | D | D | | | | C | | | | D | D | | | | | | | | |
| VCOM | | | | | | | | | | | | | | | | | VCOM2 | | | | VCOM1 | | | | | | | | | |
| NREF_Cnt | 3 | 4 | 5 | 6 | 7 | 8 | 9 | | 1 | 2 | 3 | | | 1 | 2 | 3 | | 1 | 2 | 3 | | | 1 | 2 | 3 | 4 | 5 | 6 | 7 | 8 |
| REF_Cnt | | | | | | | | 1 | | | | 2 | 3 | | | | 1 | | | | 2 | 3 | | | | | | | | |

Fig.16

| Frame | REQOUT | DATA | REF/NREF | Driving | VCOM | NREF_Cnt | REF_Cnt |
|---|---|---|---|---|---|---|---|
| 1 | | A | R | C | VCOM3 | | 1 |
| 2 | | | N | | | 1 | |
| 3 | | | N | | | 2 | |
| 4 | RO | | N | | | 3 | |
| 5 | RO | A | R | D1 | VCOM1 | | 2 |
| 6 | | A | R | D1 | | | 3 |
| 7 | | | N | | | 1 | |
| 8 | | | N | | | 2 | |
| 9 | | | N | | | 3 | |
| 10 | | | N | | | 4 | |
| 11 | | | N | | | 5 | |
| 12 | | B | N | D2 | VCOM2 | | 1 |
| 13 | | | N | | | 1 | |
| 14 | | | N | | | 2 | |
| 15 | RO | | N | | | 3 | |
| 16 | RO | B | R | D1 | VCOM1 | | 2 |
| 17 | | B | R | D1 | | | 3 |
| 18 | | | N | | | 1 | |
| 19 | | | N | | | 2 | |
| 20 | | | N | | | 3 | |
| 21 | | C | R | C | VCOM3 | | 1 |
| 22 | | | N | | | 1 | |
| 23 | | | N | | | 2 | |
| 24 | RO | | N | | | 3 | |
| 25 | RO | C | R | D1 | VCOM1 | | 2 |
| 26 | | C | R | D1 | | | 3 |
| 27 | | | N | | | 1 | |
| 28 | | | N | | | 2 | |
| 29 | | | N | | | 3 | |
| 30 | | | N | | | 4 | |

| Frame | REQOUT | DATA | REF/NREF | Driving | VCOM | NREF_Cnt | REF_Cnt |
|---|---|---|---|---|---|---|---|
| 31 | | | N | | | 5 | |
| 32 | | | N | | | 6 | |
| 33 | | | N | | | 7 | |
| 34 | | | N | | | 8 | |
| 35 | | C | R | D1 | | | 1 |
| 36 | | | N | | | 1 | |
| 37 | | | N | | | 2 | |
| 38 | | | N | | | 3 | |
| 39 | | | N | | | 4 | |
| 40 | | | N | | | 5 | |
| 41 | | | N | | | 6 | |
| 42 | | | N | | | 7 | |
| 43 | | | N | | | 8 | |
| 44 | RO | | N | | | 9 | |
| 45 | | C | R | D1 | | | 1 |
| 46 | | | N | | | 1 | |
| 47 | | | N | | | 2 | |
| 48 | | | N | | | 3 | |
| 49 | | | N | | | 4 | |
| 50 | | | N | | | 5 | |
| 51 | | D | R | D2 | VCOM2 | | 1 |
| 52 | | | N | | | 1 | |
| 53 | | | N | | | 2 | |
| 54 | RO | | N | | | 3 | |
| 55 | RO | D | N | D1 | VCOM1 | | 2 |
| 56 | | D | N | D1 | | | 3 |
| 57 | | | N | | | 1 | |
| 58 | | | N | | | 2 | |
| 59 | | | N | | | 3 | |
| 60 | | | N | | | 4 | |

Fig.17

| Frame | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| REQOUT | | | | | | | | | | | | | | | | | | | | | | | RO | | | | | | | |
| DATA | A | | | | | B | | | | | | | | C | | | | | | | | | | C | | | | | D | |
| REF/NREF | R | N | N | N | N | R | N | N | N | N | N | N | N | R | N | N | N | N | N | N | N | N | N | R | N | N | N | N | R | N |
| Driving | C | | | | | C | | | | | | | | D | | | | | | | | | | D | | | | | C | |
| VCOM | VCOM2 | | | | | | | | | | | | | VCOM1 | | | | | | | | | | | | | | | VCOM2 | |
| NREF_Cnt | | 1 | 2 | 3 | 4 | | 1 | 2 | 3 | 4 | 5 | 6 | 7 | | 1 | 2 | 3 | 4 | 5 | 6 | 7 | 8 | 9 | | 1 | 2 | 3 | 4 | | 1 |
| REF_Cnt | 1 | | | | | 1 | | | | | | | | 1 | | | | | | | | | | 1 | | | | | 1 | |

Fig.18

| Frame | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| REQOUT | | | | | | | | | | | | | | | | | | | | | | | | | | | | | | |
| DATA | A | | | | | | B | | | | | | | | C | | | | | | C | | | | | | | | C | |
| REF/NREF | R | N | N | N | N | N | R | N | N | N | N | N | N | N | R | N | N | N | N | N | R | N | N | N | N | N | N | N | R | N |
| Driving | D | | | | | | C | | | | | | | | D | | | | | | C | | | | | | | | D | |
| VCOM | VCOM1 | VCOM1 | | | | | VCOM2 | VCOM2 | | | | | | | VCOM1 | VCOM1 | | | | | VCOM2 | VCOM2 | | | | | | | VCOM1 | VCOM1 |
| NREF_Cnt | | 1 | 2 | 3 | 4 | 5 | | 1 | 2 | 3 | 4 | 5 | 6 | 7 | | 1 | 2 | 3 | 4 | 5 | | 1 | 2 | 3 | 4 | 5 | 6 | 7 | | 1 |
| REF_Cnt | 1 | | | | | | 1 | | | | | | | | 1 | | | | | | | | | | | | | | 1 | |

| Frame | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|---|---|---|---|---|---|---|---|---|---|---|
| REQOUT | | | | | | | | | | | | | | | | | | | | | | | | | | | | | | |
| DATA | | | | | C | | | | | | | | D | | | | | | E | | | | | | | | F | | | |
| REF/NREF | N | N | N | N | R | N | N | N | N | N | N | N | R | N | N | N | N | N | R | N | N | N | N | N | N | N | R | N | N | N |
| Driving | | | | | C | | | | | | | | D | | | | | | C | | | | | | | | D | | | |
| VCOM | | | | | VCOM2 | VCOM2 | | | | | | | VCOM1 | VCOM1 | | | | | VCOM2 | VCOM2 | | | | | | | VCOM1 | VCOM1 | | |
| NREF_Cnt | 2 | 3 | 4 | 5 | | 1 | 2 | 3 | 4 | 5 | 6 | 7 | | 1 | 2 | 3 | 4 | 5 | | 1 | 2 | 3 | 4 | 5 | 6 | 7 | | 1 | 2 | 3 |
| REF_Cnt | | | | | 1 | | | | | | | | 1 | | | | | | 1 | | | | | | | | 1 | | | |

Fig.19

| Frame | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| REQOUT | | | | | | | | | | | | | | | | | | | | | | | | | | | | | | |
| DATA | A | | | | | | B | | | | | | | | C | | | | | | C | | | | | | | | C | |
| REF/NREF | R | N | N | N | N | N | R | N | N | N | N | N | N | N | R | N | N | N | N | N | R | N | N | N | N | N | N | N | R | N |
| Driving | D | | | | | | D | | | | | | | | D | | | | | | D | | | | | | | | D | |
| VCOM | VCOM1 | | | | | | | | | | | | | | | | | | | | | | | | | | | | | |
| NREF_Cnt | | 1 | 2 | 3 | 4 | 5 | | 1 | 2 | 3 | 4 | 5 | 6 | 7 | | 1 | 2 | 3 | 4 | 5 | | 1 | 2 | 3 | 4 | 5 | 6 | 7 | | 1 |
| REF_Cnt | 1 | | | | | | 1 | | | | | | | | 1 | | | | | | | | | | | | | | 1 | |

| Frame | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|---|---|---|---|---|---|---|---|---|---|---|
| REQOUT | | | | | | | | | | | | | | | | | | | | | | | | | | | | | | |
| DATA | | | C | | | | | | D | | | | E | | | | | | F | | | | | | | | F | | | |
| REF/NREF | N | N | R | N | N | N | N | N | R | N | N | N | R | N | N | N | N | N | R | N | N | N | N | N | N | N | R | N | N | N |
| Driving | | | C | | | | | | C | | | | C | | | | | | C | | | | | | | | D | | | |
| VCOM | | | VCOM2 | | | | | | | | | | | | | | | | | | | | | | | | | | | |
| NREF_Cnt | 2 | 3 | | 1 | 2 | 3 | 4 | 5 | | 1 | 2 | 3 | | 1 | 2 | 3 | 4 | 5 | | 1 | 2 | 3 | 4 | 5 | 6 | 7 | | 1 | 2 | 3 |
| REF_Cnt | | | 1 | | | | | | 1 | | | | 1 | | | | | | 1 | | | | | | | | 1 | | | |

LIQUID CRYSTAL DISPLAY DEVICE AND METHOD FOR DRIVING SAME

TECHNICAL FIELD

The present invention relates to a liquid crystal display device, and specifically relates to a liquid crystal display device which performs pause driving (low-frequency driving), and a method for driving same.

BACKGROUND ART

There has hitherto been known an active matrix-type liquid crystal display device provided with a TFT (thin film transistor) as a switching element. This liquid crystal display device is provided with a liquid crystal panel configured of two insulating substrates opposed to each other. The one substrate of the liquid crystal panel is provided with gate bus lines (scanning signal lines) and source bus lines (video signal lines) in a matrix form, and is provided with TFTs in the vicinity of intersections between the gate bus lines and the source bus lines. Each TFT is configured of a gate electrode connected to the gate bus line, a source electrode connected to the source bus line, and a drain electrode. The drain electrode of each TFT is connected to one of a plurality of pixel electrodes that are arranged in a matrix form on the substrate so as to form an image. The other substrate of the liquid crystal panel is provided with a common electrode for applying a voltage between the common electrode and the pixel electrodes through a liquid crystal layer. In such a configuration, based on a video signal that the source electrode of each TFT receives from the source bus line when the gate electrode of this TFT receives an active scanning signal from the gate bus line, a voltage is applied between the pixel electrode and the common electrode. This drives the liquid crystal, and a desired image is displayed on a display portion of the liquid crystal panel.

Incidentally, the liquid crystal has a property that it deteriorates when a DC voltage continues to be applied. Accordingly, in the liquid crystal display device, AC driving to reverse polarities of pixel voltages (voltages between the pixel electrodes and the common electrode) has been performed in order to suppress deterioration in liquid crystal. As an AC driving technique, a driving technique called frame-reversal driving is known in which the polarities of the pixel voltages are reversed with respect to each frame in a state where the polarities of the pixel voltages in all the pixels are made the same. It is to be noted that the driving technique of reversing the polarities of the pixel voltages with respect to each predetermined period will be hereinafter referred to as a “reversal driving technique”. However, by the frame-reversal driving, flicker is relatively apt to occur at the time of image display. Hence there have hitherto been employed reversal driving techniques of a variety of polarity reversal patterns in order to suppress occurrence of flicker. As the reversal driving technique, column-reversal driving and dot-reversal driving are typically known.

The column-reversal driving is a driving technique of reversing the polarities of the pixel voltages with respect to each frame and each predetermined number of source bus lines. According to the column-reversal driving, the polarities of pixel voltages are reversed with respect to each predetermined number of source bus lines, and hence the frequency of spatial polarity reversal of a liquid crystal applied voltage becomes high as compared to the frame-reversal driving. For example, when the polarities of the pixel voltages are reversed with respect to each one frame and each one source bus line, polarities of pixel voltages in pixels on four rows and four columns in a certain frame become those as shown in FIG. 20. It is to be noted that in the next frame, the polarities of the pixel voltages are reversed in all the pixels.

The dot-reversal driving is a driving technique of reversing the polarities of the pixel voltages with respect to each one frame and also reversing the polarities in the pixels adjacent in a vertical or horizontal direction. In this driving technique, polarities of pixel voltages in pixels on four rows and four columns in a certain frame become those as shown in FIG. 21. It is to be noted that in the next frame, the polarities of the pixel voltages are reversed in all the pixels. According to this dot-reversal driving, the frequency of spatial polarity reversal of the liquid crystal applied voltage becomes still higher as compared to the column-reversal driving. That is, according to the dot-reversal driving, the polarity reversal pattern becomes complex as compared to the line-reversal driving and the column-reversal driving, thereby effectively suppressing occurrence of flicker. It should be noted that a driving technique of reversing the polarities of the pixel voltages with respect to each predetermined number of gate bus lines in the vertical direction is called “multi-dot-reversal driving”. For example, a driving technique of reversing the polarities of the pixel voltages with respect to each two gate bus lines in the vertical direction as shown in FIG. 22 is called “two-dot-reversal driving”.

In general, when a polarity reversal pattern in an employed reversal driving technique is complex, flicker hardly occurs, but power consumption becomes large. On the other hand, when a polarity reversal pattern in an employed reversal driving technique is simple, power consumption becomes small, but flicker is apt to occur. There has thus been required a technique for reducing power consumption while suppressing occurrence of flicker. For example, according to a liquid crystal display device disclosed in Japanese Patent Application Laid-Open No. 2005-215591, the dot-reversal driving and the column-reversal driving are switched in accordance with a frequency of an input video signal. Further, according to a liquid crystal display device disclosed in Japanese Patent Application Laid-Open No. 2003-337577, two-dot-reversal driving and one-dot-reversal driving are switched in accordance with a vertical frequency.

PRIOR ART DOCUMENTS

Patent Documents

[Patent Document 1] Japanese Patent Application Laid-Open No. 2005-215591

[Patent Document 2] Japanese Patent Application Laid-Open No. 2003-337577

SUMMARY OF THE INVENTION

Problems to be Solved by the Invention

In recent years, concerning the liquid crystal display device, there has been progress in the development of a driving method where “a pause frame (pause period) for suspending a writing operation by bringing all gate bus lines into a non-scanning state is provided between a refresh frame (writing period) and a refresh frame (writing period)”. Here, the refresh frame means a frame for charging a pixel capacitance in the display portion based on an image signal for one frame (for one screen). The driving method where the pause frame for suspending a writing operation is provided in this manner is called "pause driving", "low-frequency driving", and the like. In a liquid crystal display device to which the pause driving is employed, there is no need for giving a controlling signal or the like to a liquid crystal driving circuit (gate driver and source driver) in the pause frame. This leads to reduction in driving frequency of the liquid crystal driving circuit as a whole, thus allowing low power consumption. FIG. 23 is a diagram for explaining one example of the pause driving. In the example shown in FIG. 23, a refresh frame for one frame (one frame period is 16.67 ms) of a general liquid crystal display device with a refresh rate (driving frequency) of 60 Hz and pause frames for 59 frames alternately appear. Such pause driving is preferable for still image display.

As described above, when the pause driving is employed, low power consumption can be realized. However, in the pause driving, flicker is apt to be visually recognized when the refresh rate is low. Therefore, the pause driving also requires a technique for reducing power consumption while suppressing occurrence of flicker. With regard to this, even when the technique disclosed in Japanese Patent Application Laid-Open No. 2005-215591 is employed, a more preferable reversal driving technique is not decided in accordance with a frequency of an input video signal in the pause driving, and hence a desired effect cannot be obtained. Further, even when the technique disclosed in Japanese Patent Application Laid-Open No. 2003-337577 is employed, the frequency of refreshes has a larger influence on occurrence of flicker than the vertical frequency in the pause driving, and hence a desired effect cannot be obtained.

Accordingly, an object of the present invention is to effectively suppress occurrence of flicker while suppressing an increase in power consumption in a liquid crystal display device for performing pause driving.

Means for Solving the Problems

A first aspect of the present invention is directed to a liquid crystal display device, which employs pause driving to provide a pause frame for suspending a refresh of a screen between two refresh frames for performing a refresh of the screen, and performs image display by applying an AC voltage to liquid crystal based on an image signal irregularly inputted from an external portion, the liquid crystal display device comprising:

a liquid crystal panel that includes a plurality of pixel electrodes arranged in a matrix form and a common electrode provided for applying a voltage between the common electrode and the plurality of pixel electrodes through the liquid crystal, and displays an image based on the image signal;

a liquid crystal panel driving portion that drives the liquid crystal panel; and a reversal driving control portion that includes a pause frame counting portion for counting as a count value the number of times of pause frames since generation of a refresh frame until generation of the next refresh frame, receives the image signal, decides which of a refresh frame or a pause frame each frame is set to, and decides a reversal driving technique for applying an AC voltage to the liquid crystal, to control an operation of the liquid crystal panel driving portion, wherein, when a frame in which the image signal is inputted from the external portion without requesting the external portion to input the image signal is defined as a first input frame, the reversal driving control portion sets the first input frame to a refresh frame, and decides the reversal driving technique in the first input frame based on the count value such that the frequency of spatial polarity reversal of a liquid crystal applied voltage gradually becomes higher by at least two stages as the count value becomes larger.

According to a second aspect of the present invention, in the first aspect of the present invention, when a frame in which a reversal driving technique other than a technique with the highest frequency of the spatial polarity reversal of the liquid crystal applied voltage is employed out of a plurality of previously prepared reversal driving techniques, among the first input frames, is defined as a first refresh frame, the reversal driving control portion sets n (n is an integer not smaller than 1) frames subsequent to the first refresh frame to pause frames, sets a frame subsequent to the final pause frame to a refresh frame that is defined as a second refresh frame, and sets the reversal driving technique in the second refresh frame to a technique with the highest frequency of the spatial polarity reversal of the liquid crystal applied voltage out of the plurality of reversal driving techniques.

According to a third aspect of the present invention, in the first aspect of the present invention, when a frame in which an image based on the image signal changes as compared to the previous refresh frame is defined as a first refresh frame, the reversal driving control portion sets n (n is an integer not smaller than 1) frames subsequent to the first refresh frame to pause frames, sets a frame subsequent to the final pause frame to a refresh frame that is defined as a second refresh frame, and sets the reversal driving technique in the second refresh frame to a technique with the highest frequency of the spatial polarity reversal of the liquid crystal applied voltage out of the plurality of reversal driving techniques.

According to a fourth aspect of the present invention, in the first aspect of the present invention, when a frame, in which a reversal driving technique other than a technique with the highest frequency of the spatial polarity reversal of the liquid crystal applied voltage is employed out of a plurality of previously prepared reversal driving techniques, among the first input frames and a frame in which an image based on the image signal changes as compared to the previous refresh frame, are defined as first refresh frames, the reversal driving control portion sets n (n is an integer not smaller than 1) frames subsequent to the first refresh frame to pause frames, sets a frame subsequent to the final pause frame to a refresh frame that is defined as a second refresh frame, and sets the reversal driving technique in the second refresh frame to the technique with the highest frequency of the spatial polarity reversal of the liquid crystal applied voltage out of the plurality of reversal driving techniques.

According to a fifth aspect of the present invention, in any one of the second to fourth aspects of the present invention, the second refresh frame is made up of a plurality of frames.

According to a sixth aspect of the present invention, in the first aspect of the present invention, a potential of the common electrode is set in accordance with the reversal driving technique that is used when the liquid crystal panel is driven.

According to a seventh aspect of the present invention, in the first aspect of the present invention, the reversal driving control portion requests the external portion to input the image signal when the image signal is not inputted through a period corresponding to a previously set number of frames.

According to an eighth aspect of the present invention, in the seventh aspect of the present invention, when a frame in which the image signal is inputted from the external portion by requesting the external portion to input the image signal is defined as a second input frame, the reversal driving control portion sets the second input frame to a refresh frame, and sets the reversal driving technique in the second input frame to a technique with the highest frequency of the spatial polarity reversal of the liquid crystal applied voltage out of the plurality of reversal driving techniques.

According to a ninth aspect of the present invention, in the first aspect of the present invention, the reversal driving control portion sets the reversal driving technique in each refresh frame to either a first reversal driving technique with a relatively low frequency of the spatial polarity reversal of the liquid crystal applied voltage or a second reversal driving technique with a relatively high frequency of the spatial polarity reversal of the liquid crystal applied voltage.

According to a tenth aspect of the present invention, in the ninth aspect of the present invention, the first reversal driving technique is a column-reversal driving technique, and the second reversal driving technique is a dot-reversal driving technique.

According to an eleventh aspect of the present invention, in the ninth aspect of the present invention, a first switching threshold which is to be compared with the count value at the time of deciding whether or not to switch the reversal driving technique from the first reversal driving technique to the second reversal driving technique and a second switching threshold which is to be compared with the count value at the time of deciding whether or not to switch the reversal driving technique from the second reversal driving technique to the first reversal driving technique are previously prepared, the second switching threshold being a smaller value than the first switching threshold, when the reversal driving technique in the previous refresh frame is the first reversal driving technique, the reversal driving control portion decides the reversal driving technique in the first input frame based on a result of comparison between the count value and the first switching threshold, and when the reversal driving technique in the previous refresh frame is the second reversal driving technique, the reversal driving control portion decides the reversal driving technique in the first input frame based on a result of comparison between the count value and the second switching threshold.

According to a twelfth aspect of the present invention, in the first aspect of the present invention, the liquid crystal panel includes a scanning signal line, a video signal line which is applied with a video signal in accordance with the image signal, and a thin film transistor where a control terminal is connected to the scanning signal line, a first conduction terminal is connected to the video signal line, a second conduction terminal is connected to the pixel electrode, and a channel layer is formed of an oxide semiconductor.

According to a thirteenth aspect of the present invention, in the twelfth aspect of the present invention, the oxide semiconductor is indium gallium zinc oxide mainly composed of indium (In), gallium (Ga), zinc (Zn), and oxygen (O).

A fourteenth aspect of the present invention is directed to a driving method of a liquid crystal display device, which employs pause driving to provide a pause frame for suspending a refresh of a screen between two refresh frames for performing a refresh of the screen, and performs image display by applying an AC voltage to liquid crystal based on an image signal irregularly inputted from an external portion, the driving method comprising:

a liquid crystal panel driving step of driving a liquid crystal panel that includes a plurality of pixel electrodes arranged in a matrix form and a common electrode provided for applying a voltage between the common electrode and the plurality of pixel electrodes through the liquid crystal, and displays an image based on the image signal; and a reversal driving control step of including a pause frame counting step of counting as a count value the number of times of pause frames since generation of a refresh frame until generation of the next refresh frame, receiving the image signal, deciding which of a refresh frame or a pause frame each frame is set to, and deciding a reversal driving technique for applying an AC voltage to the liquid crystal, to control an operation in the liquid crystal panel driving step, wherein, when a frame in which the image signal is inputted from the external portion without requesting the external portion to input the image signal is defined as a first input frame, in the reversal driving control step, the first input frame is set to a refresh frame, and the reversal driving technique in the first input frame is decided based on the count value such that the frequency of spatial polarity reversal of a liquid crystal applied voltage gradually becomes higher by at least two stages as the count value becomes larger.

Effects of the Invention

According to the first aspect of the present invention, when an image signal is inputted from the external portion without requesting the external portion to input the image signal, a refresh is performed as follows. When the number of times of pause frames having been generated since the previous refresh frame is large, there is performed a refresh by the reversal driving technique with a high frequency of spatial polarity reversal of the liquid crystal applied voltage. In contrast, when the number of times of pause frames having been generated since the previous refresh frame is small, there is performed a refresh by the reversal driving technique with a low frequency of the spatial polarity reversal of the liquid crystal applied voltage. Therefore, when a temporal cycle of input of the image signal is short as a whole, there is mainly performed a refresh by the reversal driving technique with a low frequency of the spatial polarity reversal of the liquid crystal applied voltage (e.g., the column-reversal driving), and when the temporal cycle of input of the image signal is long as a whole, there is mainly performed a refresh by the reversal driving technique with a high frequency of the spatial polarity reversal of the liquid crystal applied voltage (e.g., the dot-reversal driving). Since flicker is hardly visually recognized when a refresh is frequently performed, even when the reversal driving technique with the low frequency of spatial polarity reversal of the liquid crystal applied voltage is employed, the display quality does not deteriorate. Instead there is obtained a power consumption reducing effect by employing such a reversal driving technique. Further, because the refresh by the reversal driving technique with the high frequency of the spatial polarity reversal of the liquid crystal applied voltage is mainly performed when the frequency of input of the image signal is low, deterioration in display quality due to flicker does not occur. From the above, according to the present embodiment, in the liquid crystal display device which performs the pause driving, it is possible to effectively suppress occurrence of flicker while suppressing an increase in power consumption.

According to the second aspect of the present invention, there is provided a refresh frame (second refresh frame) for performing a refresh by the reversal driving technique with the highest frequency of spatial polarity reversal of the liquid crystal applied voltage after a refresh frame in which a refresh has been performed by the reversal driving technique other than that with the highest frequency of spatial polarity reversal of the liquid crystal applied voltage out of a plurality of previously prepared reversal driving techniques, with a pause frame put between those refresh frames. This prevents deterioration in display quality due to continuing a state where writing into the pixel capacitance is performed by the reversal driving technique with a relatively low frequency of spatial polarity reversal of the liquid crystal applied voltage for a long time.

According to the third aspect of the present invention, there is provided a refresh frame (second refresh frame) for performing a refresh by the reversal driving technique with the highest frequency of spatial polarity reversal of the liquid crystal applied voltage out of a plurality of previously prepared reversal driving techniques after a refresh frame in which an image has changed, with a pause frame put between those refresh frames. Therefore, when the image changes, a plurality of times of writing (charging) into the pixel capacitance are performed. Hence the pixel voltage reliably reaches a target voltage in each pixel, thereby preventing deterioration in display quality.

According to the fourth aspect of the present invention, a similar effect to that of the second aspect of the present invention is obtained, and a similar effect to that of the third aspect of the present invention is obtained.

According to the fifth aspect of the present invention, the second refresh frame is made up of two frames. This suppresses occurrence of screen burn-in caused by deviation of the polarity of the pixel voltage in each pixel.

According to the sixth aspect of the present invention, even when the optimum common electrode potential is different with respect to each reversal driving technique, it is possible to suppress deterioration in liquid crystal.

According to the seventh aspect of the present invention, deterioration in pixel voltage due to performance of no refresh for a long period is prevented.

According to the eighth aspect of the present invention, deterioration in pixel voltage due to performance of no refresh for a long period is prevented, while occurrence of flicker is effectively suppressed.

According to the ninth aspect of the present invention, the reversal driving technique is switched between two techniques (the first reversal driving technique and the second reversal driving technique). Therefore, a similar effect to that of the first aspect of the present invention is obtained with a relatively simple configuration.

According to the tenth aspect of the present invention, the reversal driving technique is switched between the column-reversal driving technique where power consumption is low and the dot-reversal driving technique where flicker is hardly visually recognized, whereby it is possible to reliably achieve the effect of the first aspect of the present invention.

According to the eleventh aspect of the present invention, in the liquid crystal display device which performs pause driving, even when the image signal is inputted every time a pause frame is generated the number of times close to a threshold, it is possible to effectively suppress occurrence of flicker while suppressing an increase in power consumption.

According to the twelfth aspect of the present invention, a thin film transistor where a channel layer is formed of an oxide semiconductor is used as the thin film transistor provided in the liquid crystal panel. Therefore, a voltage written into the capacitance (pixel capacitance) between the pixel electrode and the common electrode is held over a long time. Hence it is possible to lower the frequency of refreshes when the image signal is not inputted from the external portion, without causing deterioration in display quality. From the above, in the liquid crystal display device for performing the pause driving, it is possible to significantly reduce power consumption while suppressing occurrence of flicker.

According to the thirteenth aspect of the present invention, by using indium gallium zinc oxide as the oxide semiconductor that forms the channel layer, it is possible to reliably achieve the effect of the twelfth aspect of the present invention.

According to the fourteenth aspect of the present invention, a similar effect to that of the first aspect of the present invention can be obtained in the method for driving the liquid crystal display device.

BRIEF DESCRIPTION OF THE DRAWINGS

FIG. 3 is a diagram for explaining a method for deciding a refresh frame and a method for deciding a reversal driving technique in the first embodiment.

FIG. 4 is a diagram for explaining the method for deciding a refresh frame and the method for deciding a reversal driving technique in the first embodiment.

FIG. 5 is a diagram for explaining the method for deciding a refresh frame and the method for deciding a reversal driving technique in the first embodiment.

FIG. 6 is a diagram for explaining the method for deciding a refresh frame and the method for deciding a reversal driving technique in the first embodiment.

FIG. 7 is a diagram for explaining the method for deciding a refresh frame and the method for deciding a reversal driving technique in the first embodiment.

FIG. 8 is a diagram for explaining the method for deciding a refresh frame and the method for deciding a reversal driving technique in the first embodiment.

FIG. 9 is a diagram for explaining the method for deciding a refresh frame and the method for deciding a reversal driving technique in the first embodiment.

FIG. 10 is a diagram for explaining the method for deciding a refresh frame and a method for deciding a reversal driving technique in the first embodiment.

FIG. 11 is a diagram for explaining the method for deciding a refresh frame and the method for deciding a reversal driving technique in the first embodiment.

FIG. 12 is a diagram for explaining the method for deciding a refresh frame and the method for deciding a reversal driving technique in the first embodiment.

FIG. 13 is a diagram for explaining a concrete example (first concrete example) of the driving in the first embodiment.

FIG. 14 is a diagram for explaining a concrete example (second concrete example) of the driving in the first embodiment.

FIG. 16 is a diagram for explaining the concrete example of the driving in the modified example of the first embodiment.

FIG. 17 is a diagram for explaining a concrete example of the driving in a second embodiment of the present invention.

FIG. 18 is a diagram for explaining a problem which is going to be solved by a modified example of the second embodiment.

FIG. 19 is a diagram for explaining a concrete example of the driving in the modified example of the second embodiment.

MODE FOR CARRYING OUT THE INVENTION

Hereinafter, embodiments of the present invention will be described with reference to attached drawings. It is to be noted that in the present specification, charging of a pixel capacitance in a display portion based on an image signal for one frame regardless of the presence or absence of an image change is referred to as "refresh".

1. First Embodiment

1.1 Whole Configuration and Summary of Operation

Figure 2:
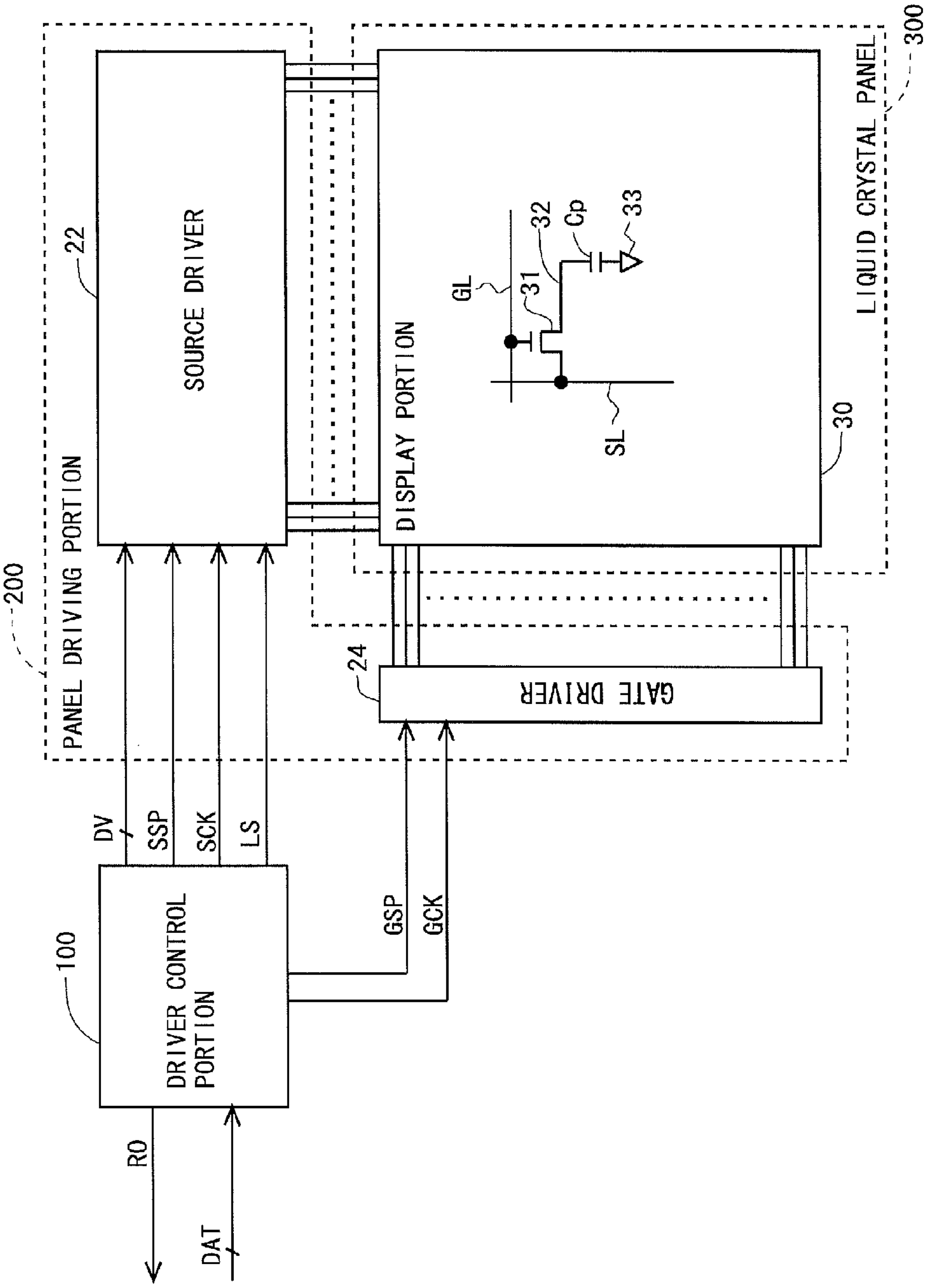
FIG. 2 is a block diagram showing a whole configuration of the liquid crystal display device in the first embodiment.

FIG. 2 is a block diagram showing a whole configuration of a liquid crystal display device according to a first embodiment of the present invention. This liquid crystal display device is configured of a driver control portion 100, a panel driving portion 200, and a liquid crystal panel 300. The panel driving portion 200 includes a source driver (video signal line drive circuit) 22 and a gate driver (scanning signal line drive circuit) 24. The liquid crystal panel 300 includes a display portion 30. It is to be noted that a detailed configuration of the driver control portion 100 will be described later.

Figure 23:
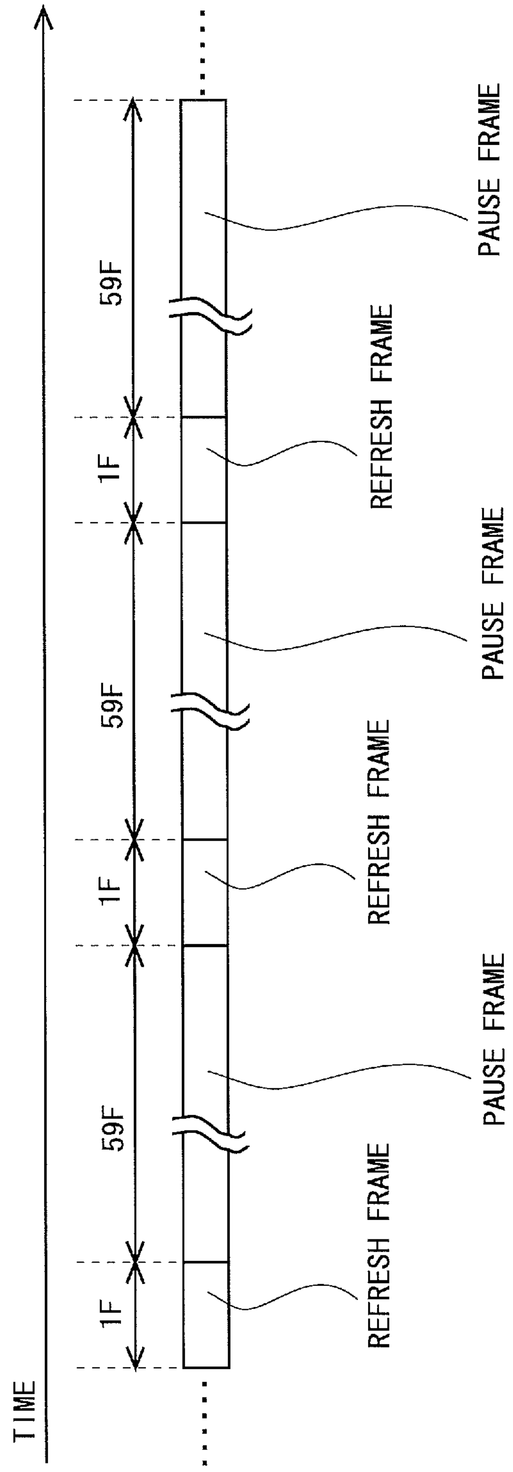
FIG. 23 is a diagram for explaining one example of low-frequency driving.

In the liquid crystal display device according to the present embodiment, pause driving (low-frequency driving) is performed (see FIG. 23). That is, several to several tens of pause frames are provided after a refresh frame for charging a pixel capacitance in a display portion 30. However, the number of pause frames that appear between two refresh frames is appropriately changed during operation of the liquid crystal display device.

Concerning FIG. 2, the display portion 30 is provided with a plurality of source bus lines (video signal lines) SL and a plurality of gate bus lines (scanning signal lines) GL. A pixel formation portion for forming a pixel is provided corresponding to each intersection of the source bus line SL and the gate bus line GL. That is, a plurality of pixel formation portions are included in the display portion 30. The above plurality of pixel formation portions are arranged in a matrix form to constitute a pixel array. Each pixel formation portion is configured of: a TFT (thin film transistor) 31 as a switching element whose gate terminal (control terminal) is connected to the gate bus line GL passing through the corresponding intersection and whose source terminal (first conduction terminal) is connected to the source bus line SL passing through that intersection; a pixel electrode 32 connected to a drain terminal (second conduction terminal) of the TFT 31; a common electrode 33 as a counter electrode for giving a common voltage to the plurality of pixel formation portions; and liquid crystal (liquid crystal layer) commonly provided in the plurality of pixel formation portions and placed between the pixel electrode 32 and the common electrode 33. A liquid crystal capacitance formed by the pixel electrode 32 and the common electrode 33 constitutes a pixel capacitance Cp. Generally, an auxiliary capacitance is provided in parallel to the liquid crystal capacitance so as to reliably hold a voltage in the pixel capacitance Cp, but a description and illustration of the auxiliary capacitance will be omitted since it is not directly related to the present invention. It is to be noted that only constitutional elements corresponding to one pixel formation portion are shown in the display portion 30 in FIG. 2. Further, the common electrode 33 is not necessarily required to be provided as opposed to the pixel electrode 32. That is, the present invention is also applicable to a liquid crystal display device that employs a lateral electric field mode (e.g., IPS mode) as a technique where the pixel electrode 32 and the common electrode 33 are provided on the same substrate to generate an electric field not in a vertical direction but in a lateral direction with respect to the surface of the substrate.

As described above, in the liquid crystal display device according to the present embodiment, the pause driving is performed. In the present embodiment, an oxide TFT (thin film transistor using an oxide semiconductor for a channel layer) is typically used as the TFT 31 in the pixel formation portion. More specifically, the channel layer of the TFT 31 is formed of InGaZnOx: indium gallium zinc oxide, mainly composed of indium (In), gallium (Ga), zinc (Zn), and oxygen (O). Hereinafter, a TFT using InGaZnOx for the channel layer will be referred to as an "IGZO-TFT". Incidentally, a thin film transistor using amorphous silicon or the like for the channel layer (hereinafter referred to as "silicon TFT") has a relatively large off-leak current. For this reason, in the case of using the silicon TFT as the TFT 31 in the pixel formation portion, an electric charge held in the pixel capacitance Cp leaks through the TFT 31, resulting in fluctuation in voltage that is to be held at the time of an off-state. In contrast, the IGZO-TFT has a far smaller off-leak current as compared to the silicon TFT. Hence it is possible to hold a voltage written into the pixel capacitance Cp (liquid crystal applied voltage) for a longer period. The IGZO-TFT is thus preferable for the case of performing the pause driving. It should be noted that a similar effect is obtained also in the case of using, for the channel layer, an oxide semiconductor containing at least one of indium, gallium, zinc, copper (Cu), silicon (Si), tin (Sn), aluminum (Al), calcium (Ca), germanium (Ge), and lead (Pb), for example. Further, using the oxide TFT as the TFT 31 in the pixel formation portion is a mere example, and in place of this, the silicon TFT or the like may be used.

Next, operations of the constitutional elements shown in FIG. 2 will be described. An image signal DAT is irregularly transmitted from an external portion (host) to this liquid crystal display device. The driver control portion 100 receives the image signal DAT, and outputs a digital video signal DV; a source start pulse signal SSP, a source clock signal SCK, and a latch strobe signal LS which are signals for controlling an operation of a source driver 22; and a gate start pulse signal GSP and a gate clock signal GCK which are signals for controlling an operation of a gate driver 24. Further, the driver control portion 100 outputs a signal (hereinafter referred to as "request signal") RO for requesting the external portion (host) to input the image signal DAT, as required. The source driver 22 applies a driving video signal to each source bus line SL based on the digital video signal DV, the source start pulse signal SSP, the source clock signal SCK, and the latch strobe signal LS which are outputted from the driver control portion 100. The gate driver 24 applies a scanning signal to each gate bus line GL based on the gate start pulse signal GSP and the gate clock signal GCK which are outputted from the driver control portion 100. Accordingly, the plurality of gate bus lines GL are selectively driven one by one.

In such a manner as above, by the driving video signal being applied to each source bus line SL and the scanning signal being applied to each gate bus line GL, an image based on the image signal DAT is displayed on the display portion 30 of the liquid crystal panel 300.

As described above, the image signal DAT is irregularly transmitted from the external portion (host) to this liquid crystal display device. With regard to this, a frame in which the image signal DAT has been inputted from the external portion (host) without outputting a request signal RO to the external portion (host) will be hereinafter referred to as a "first input frame". Further, a frame in which the image signal DAT has been inputted from the external portion by outputting the request signal RO to the external portion (host) will be hereinafter referred to as a "second input frame". It is to be noted that the reason why the configuration has been formed so as to irregularly transmit the image signal DAT is because the image signal DAT is not necessarily required to be inputted in all frames in the liquid crystal display device that employs the pause driving.

1.2. Configuration and Operation of Driver Control Portion

Figure 1:
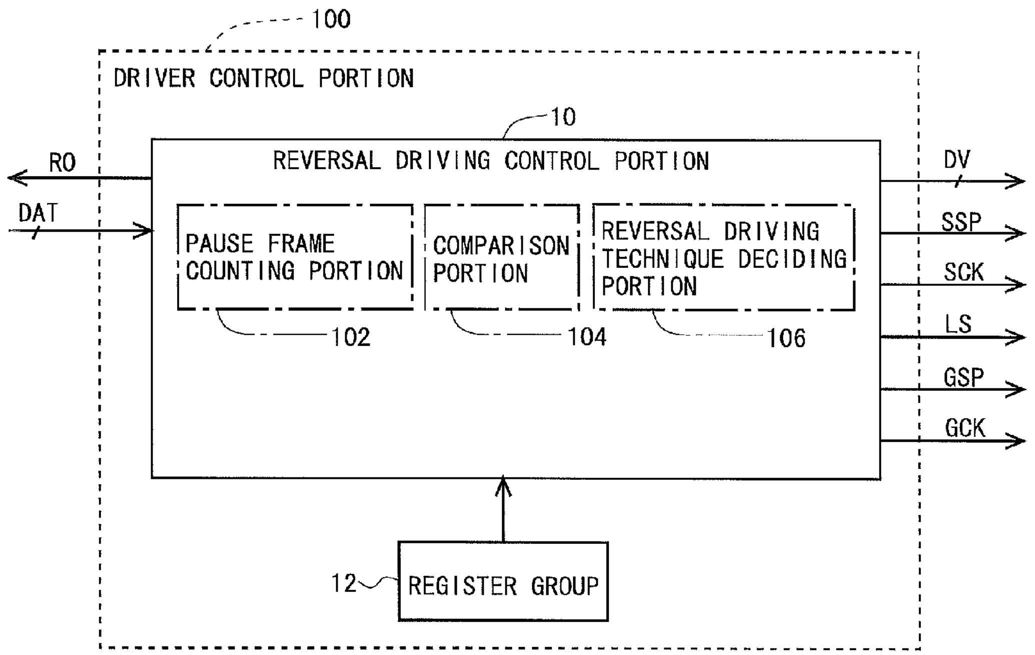
FIG. 1 is a block diagram showing a configuration of a driver control portion in a liquid crystal display device according to a first embodiment of the present invention.

Next, a description will be given of a configuration and an operation of the driver control portion 100 in the present embodiment. FIG. 1 is a block diagram showing a configuration of the driver control portion 100 in the present embodiment. The driver control portion 100 includes a reversal driving control portion 10 and a register group 12. The reversal driving control portion 10 includes a pause frame counting portion 102, a comparison portion 104, and a reversal driving technique deciding portion 106.

The reversal driving control portion 10 receives the image signal DAT and decides which of a refresh frame or a pause frame each frame is set to, and also decides the reversal driving technique for applying an AC voltage to the liquid crystal. Then, in the frame set to the refresh frame, the reversal driving control portion 10 outputs the digital video signal DV based on the image signal DAT, and also outputs the source start pulse signal SSP, the source clock signal SCK, the latch strobe signal LS, the gate start pulse signal GSP, and the gate clock signal GCK such that the liquid crystal panel 300 is driven in accordance with the decided reversal driving technique. Further, the reversal driving control portion 10 outputs the request signal RO to the external portion (host) as required. A variety of set values concerning the decision of the refresh frame and the decision of the reversal driving technique are stored in the register group 12, and those set values are referred to by the reversal driving control portion 10.

The pause frame counting portion 102 counts the number of times of pause frames since generation of a refresh frame until generation of the next refresh frame. It should be noted that, hereinafter, a value obtained by counting by the pause frame counting portion 102 will be referred to as a "count value", and the count value is attached with a reference character Cnt. The comparison portion 104 compares the count value Cnt with a previously set threshold (set value of a register SWTH described later) TH. In view of the comparison result by the comparison portion 104, the reversal driving technique deciding portion 106 decides which of a refresh frame or a pause frame each frame is set to, and also decides the reversal driving technique.

In the present embodiment, it is assumed that the register group includes five registers having register names of "REF", "NREF", "REFINT", "REFDET" and "SWTH". What each register serves for will be described later. Further, it is assumed that values of the above five registers are set as follows.

REF=1
NREF=9
REFINT=3
REFDET=3
SWTH=6

Figure 20:
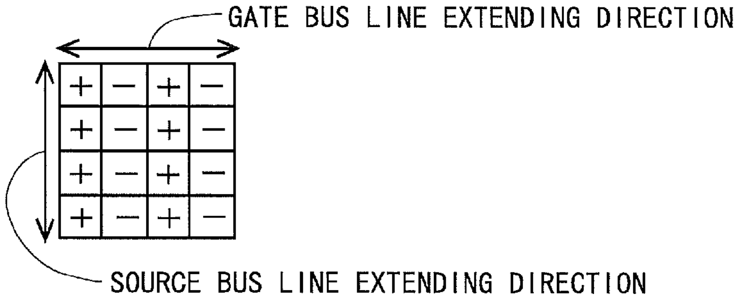
FIG. 20 is a diagram showing a polarity reversal pattern of column-reversal driving.
Figure 21:
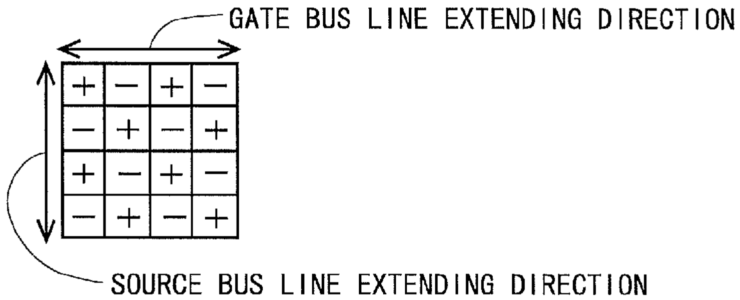
FIG. 21 is a diagram showing a polarity reversal pattern of dot-reversal driving.
Figure 22:
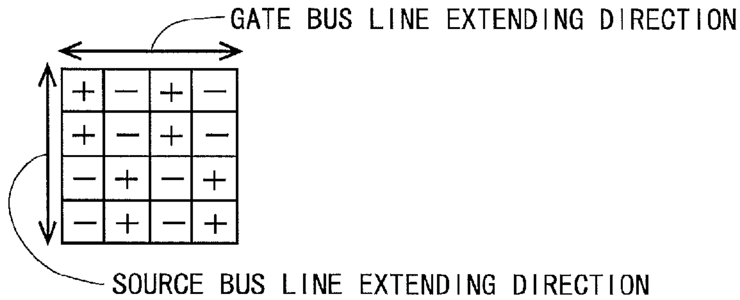
FIG. 22 is a diagram showing a polarity reversal pattern of two-dot-reversal driving.

It is to be noted that in the present embodiment, either column-reversal driving (see FIG. 20) or dot-reversal driving (see FIG. 21) is employed as the reversal driving technique in each refresh frame. With regard to this, as grasped from FIGS. 20 and 21, the frequency of the spatial polarity reversal of the liquid crystal applied voltage is higher in the dot-reversal driving than in the column-reversal driving. That is, in the present embodiment, the column-reversal driving corresponds to the first reversal driving technique with a relatively low frequency of spatial polarity reversal of the liquid crystal applied voltage, and the dot-reversal driving corresponds to the second reversal driving technique with a relatively high frequency of spatial polarity reversal of the liquid crystal applied voltage.

1.3. Method for Deciding Refresh Frame and Method for Deciding Reversal Driving Technique Next, with reference to FIGS. 3 to 12, a description will be given of a method for deciding which of a refresh frame or a pause frame each frame is set to, and a method for deciding the reversal driving technique. First, a description concerning FIGS. 3 to 12 will be given below. A number in a "Frame" field shows the frame number when it is assumed that a certain refresh frame is "zero-th" frame. A "REQOUT" field shows the presence or absence of output of the request signal RO in each frame. "RO" represents outputting the request signal RO. In a "DATA" field, there is put an alphabet for specifying an image in each frame based on the image signal DAT transmitted from the external portion. That is, a change in alphabet in the "DATA" field shows a change in image. Further, a frame inputted with an alphabet shows that it is a frame in which the image signal DAT has been inputted. A "REF/NREF" field shows which of a refresh frame or a pause frame each frame is. "R" represents a refresh frame, and "N" represents a pause frame. A "Driving" field shows the reversal driving technique in the refresh frame. "C" represents the column-reversal driving, and "D" represents the dot-reversal driving. It is to be noted that in FIGS. 3 to 6, the request signal RO is not particularly concerned and the "REQOUT" field is thus omitted.

In the present embodiment, the first input frame (frame in which the image signal DAT is inputted from the external portion without outputting the request signal RO) is set to a refresh frame. In the reversal driving control portion 10, for example, when a vertical synchronization signal is detected, it is determined that the image signal DAT has been inputted. Here, when the image signal DAT is inputted before generation of the number of times (six times in the present embodiment) of pause frames set by the register SWTH since performance of the previous refresh, the reversal driving technique in the first input frame is set to the column-reversal driving. In contrast, when the image signal DAT is inputted after generation of the number of times (six times in the present embodiment) of pause frames set by the register SWTH since performance of the previous refresh, the reversal driving technique in the first input frame is set to the dot-reversal driving. Incidentally, comparison between a set value TH of the register SWTH and the number of times of generation of pause frames (count value Cnt) is performed by the foregoing comparison portion 104. Then, when "Cnt≥TH", the reversal driving technique in the first input frame is set to the dot-reversal driving, and when "Cnt<TH", the reversal driving technique in the first input frame is set to the column-reversal driving. It should be noted that, as grasped from the above, the register SWTH serves to hold a value that is a threshold for use in decision of the reversal driving technique and is to be compared with the number of times of pause frames after the previous refresh is performed.

For example, when an image signal DAT is inputted in the ninth frame on the assumption that the previous refresh frame is taken as the zero-th frame, the ninth frame is set as a refresh frame, and the reversal driving technique in the ninth frame is set to the dot-reversal driving, as shown in FIG. 3. When an image signal DAT is inputted in the seventh frame on the assumption that the previous refresh frame is taken as the zero-th frame, the seventh frame is set as a refresh frame, and the reversal driving technique in the seventh frame is set to the dot-reversal driving, as shown in FIG. 4. When an image signal DAT is inputted in the sixth frame on the assumption that the previous refresh frame is taken as the zero-th frame, the sixth frame is set as a refresh frame, and the reversal driving technique in the sixth frame is set to the column-reversal driving, as shown in FIG. 5. When an image signal DAT is inputted in the third frame on the assumption that the previous refresh frame is taken as the zero-th frame, the third frame is set as a refresh frame, and the reversal driving technique in the third frame is set to the dot-reversal driving, as shown in FIG. 6. It is to be noted that the presence or absence of the change in image does not affect decision of the reversal driving technique.

Incidentally, when the number of times (nine times in the present embodiment) of pause frames set by the register NREF are generated after the previous refresh frame without input of the image signal DAT, the request signal RO is outputted to the external portion (host) such that the image signal DAT is inputted in the next frame after the final pause frame. In the present embodiment, when the previous refresh frame is taken as zero-th frame, the request signal RO is outputted in the ninth frame, as shown in FIG. 7. Thereby, the image signal DAT is inputted from the external portion in the tenth frame. That is, the tenth frame becomes the second input frame. At this time, nine pause frames have been generated since the previous refresh frame, and hence the reversal driving technique in the tenth frame is set to the dot-reversal driving. It is to be noted that, after the final pause frame, the refresh frame continues just the number of times set by the register REF (once in the present embodiment). In such a manner, the register REF serves to hold the number of times of refresh frames that continues after the final pause frame in the case where the number of times of pause frames set by the register NREF are generated since the previous refresh frame. The register NREF serves to hold the number of times of continuation of pause frames, in the number of times of continuation the request signal RO is to be outputted.

Further, in the present embodiment, when the frame in which the column-reversal driving has been performed and the frame in which the image has changed are defined as first refresh frames, the number of times of frames set by the register REFINT (three times in the present embodiment) subsequent to the first refresh frame are set as pause frames. Then, one or a plurality of frames subsequent to the final pause frame is set as a refresh frame (this refresh frame is defined as a second refresh frame). The number of second refresh frames is set such that a total of the number of first refresh frames (once in the present embodiment) and the number of second refresh frames becomes the number of times set by the register REFDET (three times in the present embodiment). The reversal driving technique in the second refresh frame is set to the dot-reversal driving. It is to be noted that in the second refresh frame, the image signal DAT is inputted from the external portion by the request signal RO being outputted in the previous frame. As grasped from the above, the register REFINT serves to hold the number of times of pause frames continuing after the foregoing first refresh frame, and the register REFDET serves to hold a sum of the number of times of first refresh frames and second refresh frames in the case where the column-reversal driving is performed or the image changes.

For example, when the frame in which the column-reversal driving has been performed is taken as the zero-th frame, the first frame to the third frame are set as pause frames, and the fourth frame and the fifth frame are set as refresh frames (second refresh frames), as shown in FIG. 8. The reversal driving technique in each of the fourth frame and the fifth frame is set to the dot-reversal driving. Further, for example as shown in FIG. 9, when the image has changed in the seventh frame, the eighth to tenth frames are set as pause frames, and the eleventh and twelfth frames are set as refresh frames (second refresh frames). The reversal driving technique in each of the eleventh frame and the twelfth frame is set to the dot-reversal driving. It is to be noted that, when the dot-reversal driving is performed without being accompanied by an image change, a refresh frame as the second refresh frame is not provided (FIG. 10), differently from the example shown in FIG. 9.

As described above, in the present embodiment, after the first refresh frame, three times of pause frames are generated, and then the second refresh frame is given. However, the image signal DAT may be inputted before generation of three times of pause frames. For example, when an image signal DAT is inputted in the second frame on the assumption that the first refresh frame is taken as the zero-th frame, the second frame is set as a refresh frame, and the reversal driving technique in the second frame is set to the column-reversal driving (see FIG. 11). Then, the second frame is taken as the first refresh frame, and frames (the sixth and seventh frames here) after generation of three times of pause frames (the third to fifth frames here) are set as the second refresh frames (see FIG. 11).

Further, when a refresh by the column-reversal driving is performed consecutively in two frames (the first and second frames in FIG. 12), frames (the fifth and sixth frames here) after generation of three times of pause frames since the latter refresh frame (the second frame here) are set as the second refresh frames.

It is to be noted that the above processing (processing for deciding which of a refresh frame or a pause frame each frame is set to and processing for deciding the reversal driving technique) is performed by the reversal driving technique deciding portion 106 in the reversal driving control portion 10.

1.4 Concrete Example

Next, with reference to FIGS. 13 and 14, concrete examples of the driving in the present embodiment will be described. It should be noted that, concerning FIGS. 13 and 14, the "Frame", "REQOUT", "DATA", "REF/NREF", and "Driving" fields show similar contents to those in FIGS. 3 to 12. A "VCOM" field shows a potential of the common electrode 33 in each frame. In the present embodiment, a potential of the common electrode 33 is set to either "VCOM1" or "VCOM2". "VCOM1" and "VCOM2" are different potentials. An "NREF_Cnt" field shows the frame number of each pause frame when it is assumed that the previous refresh frame is "zero-th" frame. It is to be noted that a value of NREF_Cnt in a frame immediately before the first input frame becomes the count value Cnt to be compared with the threshold TH. A "REF_Cnt" field shows the refresh frame number of each refresh frame based on a set value of the register REF or a set value of the register REFDET.

1.4.1 First Concrete Example

A first concrete example will be described with reference to FIG. 13. The first frame is a refresh frame in which the reversal driving technique is the column-reversal driving. Three frames (the second to fourth frames) subsequent to the first frame are pause frames in accordance with the set value of the register REFINT. Two frames (the fifth and sixth frames) subsequent thereto are refresh frames in accordance with the set value of the register REFDET. Because the fifth and sixth frames become the second refresh frames, the reversal driving technique in each of the fifth and sixth frames is the dot-reversal driving. It is to be noted that the request signal RO for requesting to input the image signal DAT in the fifth and sixth frames is outputted in the fourth and fifth frames.

Thereafter, the image signal DAT is inputted in the ninth frame. At this time, the number of times (six times in the present embodiment) of pause frames set by the register SWTH have not been generated since the previous refresh frame, and hence the ninth frame becomes a refresh frame in which the reversal driving technique is the column-reversal driving. Then, the tenth to twelfth frames become pause frames, and the thirteenth and fourteenth frames become refresh frames (second refresh frames) in which the reversal driving technique is the dot-reversal driving. The twentieth frame becomes a refresh frame in which the reversal driving technique is the column-reversal driving for a similar reason to the ninth frame.

Next, the image signal DAT is inputted in the thirty-second frame. At this time, the number of times of pause frames set by the register SWTH have been generated since the previous refresh frame, and hence the thirty-second frame becomes a refresh frame in which the reversal driving technique is the dot-reversal driving. It is to be noted that the dot-reversal driving is performed without being accompanied by an image change, and hence a refresh frame as the second refresh frame is not provided.

Next, the image signal DAT is inputted in the thirty-ninth frame. This thirty-ninth frame becomes a refresh frame in which the reversal driving technique is the dot-reversal driving for a similar reason to the thirty-second frame. However, because the image has changed in the thirty-ninth frame, a refresh frame as the second refresh frame is provided. Therefore, the forty-third and forth-fourth frames become refresh frames in which the reversal driving technique is the dot-reversal driving.

Next, the image signal DAT is inputted in the forty-sixth frame. At this time, the number of times of pause frames set by the register SWTH have not been generated since the previous refresh frame, and hence the forty-sixth frame becomes a refresh frame in which the reversal driving technique is the column-reversal driving. Then, the forty-seventh to forty-ninth frames become pause frames, and the fiftieth and fifty-first frames become refresh frames (second refresh frames) in which the reversal driving technique is the dot-reversal driving.

Thereafter, the number of times (nine times in the present embodiment) of pause frames (fifty-second to sixtieth frames) set by the register NREF have been generated without input of the image signal DAT, and hence the request signal RO is outputted to the external portion (host) in the final pause frame (the sixtieth frame).

1.4.2 Second Concrete Example

A second concrete example will be described with reference to FIG. 14. The first frame is a refresh frame in which the reversal driving technique is the column-reversal driving. Thereafter, the image signal DAT is inputted in the third frame and the sixth frame. The image signal DAT has been inputted without generation of three times of pause frames since the previous refresh frame in this way, and hence a refresh frame as the second refresh frame has not been provided from the first frame to the sixth frame.

Thereafter, the tenth frame and the eleventh frame are treated as refresh frames as the second refresh frame, and the image signal DAT is inputted in the sixteenth frame. The number of times (six times in the present embodiment) of pause frames set by the register SWTH have not been generated since the previous refresh frame, and hence the sixteenth frame becomes a refresh frame in which the reversal driving technique is the column-reversal driving. Then, the seventeenth to nineteenth frames become pause frames, and the twentieth and twenty-first frames become refresh frames (second refresh frames) in which the reversal driving technique is the dot-reversal driving.

Next, the image signal DAT is inputted in the twenty-eighth frame. At this time, the number of times of pause frames set by the register SWTH have been generated since the previous refresh frame, and hence the twenty-eighth frame becomes a refresh frame in which the reversal driving technique is the dot-reversal driving. It is to be noted that the dot-reversal driving is performed without being accompanied by an image change, and hence a refresh frame as the second refresh frame is not provided.

Thereafter, the number of times (nine times in the present embodiment) of pause frames (the twenty-ninth to thirty-seventh frames) set by the register NREF have been generated without input of the image signal DAT, and hence the request signal RO is outputted to the external portion (host) in the final pause frame (the thirty-seventh frame). Then, the image signal DAT is inputted from the external portion in the thirty-eighth frame. At this time, the number of times of pause frames set by the register SWTH have been generated since the previous refresh frame, and hence the thirty-eighth frame becomes a refresh frame in which the reversal driving technique is the dot-reversal driving. Further, the image has changed in the thirty-eighth frame, and hence a refresh frame as the second refresh frame is provided. That is, the forty-second and forty-third frames become refresh frames in which the reversal driving technique is the dot-reversal driving.

Next, the image signal DAT is inputted in the forty-seventh frame. This forty-seventh frame becomes a refresh frame in which the reversal driving technique is the dot-reversal driving for a similar reason to the sixteenth frame. Then, the forty-eighth to fiftieth frames become pause frames, and the fifty-first and fifty-second frames become refresh frames (second refresh frames) in which the reversal driving technique is the dot-reversal driving.

1.4.3 About Common Electrode Potential

Incidentally, in the example shown in FIGS. 13 and 14, the common electrode potential is set to VCOM2 when the column-reversal driving is performed, and the common electrode potential is set to VCOM1 when the dot-reversal driving is performed. As thus described, in the present embodiment, the common electrode potential is set to a value that is different between at the time when the liquid crystal panel 300 is driven by the column-reversal driving and at the time when the liquid crystal panel 300 is driven by the dot-reversal driving. By setting the value of the common electrode potential in such a manner, even when the optimum common electrode potential (which is a common electrode potential such that a charging rate at the time of writing with the positive polarity is equal to a charging rate at the time of writing with the negative polarity, and is also called the optimum counter potential) is different between the column-reversal driving and the dot-reversal driving, deterioration in liquid crystal can be suppressed.

1.5. Effect

According to the present embodiment, in a frame in which the image signal DAT has been inputted from the external portion without requesting the external portion to input the image signal DAT, a refresh is performed as follows. When the image signal DAT is inputted before generation of the previously set number of times of pause frames since the previous refresh frame, a refresh by the column-reversal driving is performed. In contrast, when the image signal DAT is inputted after generation of the previously set number of times of pause frames since the previous refresh frame, a refresh by the dot-reversal driving is performed. Thereby, when the image signal DAT is frequently inputted, a refresh by the column-reversal driving is performed every time the image signal DAT is inputted. In contrast, when the frequency of input of the image signal DAT is low, only a refresh by the dot-reversal driving is performed. Therefore, when the temporal cycle of input of the image signal is short as a whole, a refresh by the column-reversal driving is mainly performed, and when the temporal cycle of input of the image signal is long as a whole, a refresh by the dot-reversal driving is mainly performed. When a refresh is frequently performed, flicker is hardly visually recognized, and hence, even when the column-reversal driving is performed, the display quality does not deteriorate. Instead there is obtained a power consumption reducing effect by performing the column-reversal driving. Further, because the dot-reversal driving is mainly performed when the frequency of input of the image signal DAT is low, deterioration in display quality due to flicker does not occur. From the above, according to the present embodiment, in the liquid crystal display device for performing the pause driving, it is possible to effectively suppress occurrence of flicker while suppressing an increase in power consumption.

Further, according to the present embodiment, after the refresh frame in which the image has changed, a refresh frame (second refresh frame) in which the reversal driving technique is the dot-reversal driving is provided with a pause frame put between the refresh frames. Therefore, when the image changes, a plurality of times of writing (charging) into the pixel capacitance are performed. Hence the pixel voltage reliably reaches a target voltage in each pixel, thereby preventing deterioration in display quality. Moreover, regardless of the presence or absence of an image change, after the refresh frame in which the column-reversal driving has been performed, a refresh frame (second refresh frame) in which the reversal driving technique is the dot-reversal driving is provided with a pause frame put between the refresh frames. This prevents deterioration in display quality due to continuing a state where writing into the pixel capacitance is performed by the column-reversal driving for a long time.

Further, the dot-reversal driving is performed in the second refresh frame. In the present embodiment, the second refresh frame is made up of two frames. This suppresses occurrence of screen burn-in caused by deviation of the polarity of the pixel voltage in each pixel.

Furthermore, according to the present embodiment, the potential of the common electrode 33 is set to a different value between at the time when the column-reversal driving is performed and at the time when the dot-reversal driving is performed. For this reason, even when the optimum common electrode potential is different between the column-reversal driving and the dot-reversal driving, it is possible to suppress deterioration in liquid crystal.

Further, when a TFT using an oxide semiconductor for a channel layer is employed as the TFT 31 that is provided in the display portion 30 of the liquid crystal panel 300, a voltage written in a capacitance (pixel capacitance Cp) between the pixel electrode 32 and the common electrode 33 is held over a long time. Hence it is possible to make a refresh rate still lower (make the set value of the foregoing register NREF larger) without causing deterioration in display quality. Accordingly, the frequency of refreshes when the image signal is not inputted from the external portion becomes low, thus allowing significant reduction in power consumption. Especially by employing InGaZnOx as the oxide semiconductor, it is possible to reliably obtain a power consumption reducing effect.

1.6 Modified Example

Figure 15:
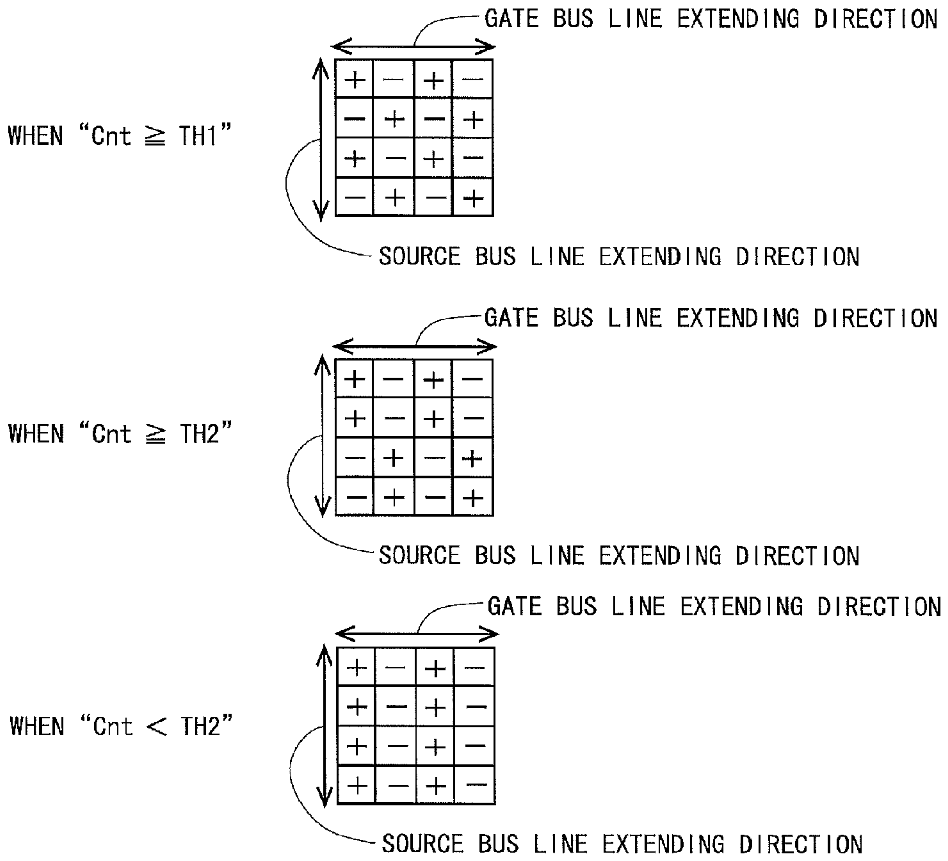
FIG. 15 is a diagram for explaining switching of the reversal driving technique in a modified example of the first embodiment.

In the first embodiment, the reversal driving technique has been switched between two techniques (column-reversal driving and dot-reversal driving). However, the present invention is not limited to this, and the reversal driving technique may be switched among three or more techniques. For example, the reversal driving technique in the first input frame can be switched among three techniques, as shown in FIG. 15, in accordance with the magnitude relation between the count value Cnt indicating the number of times of pause frames since the previous refresh frame and previously set two thresholds (first threshold TH1 and second threshold TH2) ("TH1>TH2" here). It is to be noted that in order to realize this, in the present modified example, a register SWTH1 for holding the first threshold TH1 and a register SWTH2 for holding the second threshold TH2 are provided in place of the register SWTH in the first embodiment.

In the example shown in FIG. 15, when the count value Cnt is not smaller than the first threshold TH1, the dot-reversal driving is performed. When the count value Cnt is not smaller than the second threshold TH2 (more specifically, when the count value Cnt is smaller than the first threshold TH1 and not smaller than the second threshold TH2), the two-dot-reversal driving is performed. When the count value Cnt is smaller than the second threshold TH2, the column-reversal driving is performed. FIG. 16 shows a concrete example at this time. It should be noted that it is assumed that the first threshold TH1 (value of the register SWTH1) is set to "6", and the second threshold TH2 (value of the register SWTH2) is set to "4". Further, concerning the "Driving" field in FIG. 16, "D1" represents the dot-reversal driving, "D2" represents the two-dot-reversal driving, and "C" represents the column-reversal driving. When focusing on the twelfth frame, the number of times of pause frames since the previous refresh frame is "5". That is, the count value Cnt is "5", and hence the reversal driving technique in the twelfth frame is set to the two-dot-reversal driving. When focusing on the twenty-first frame, the number of times of pause frames since the previous refresh frame is "3". That is, the count value Cnt is "3", and hence the reversal driving technique in the twenty-first frame is set to the column-reversal driving. When focusing on the thirty-fifth frame, the number of times of pause frames since the previous refresh frame is "8". That is, the count value Cnt is "8", and hence the reversal driving technique in the thirty-fifth frame is set to the dot-reversal driving.

Incidentally, the second refresh frame is not provided after a frame in which the reversal driving technique has been set to the dot-reversal driving (e.g., thirty-fifth frame in FIG. 16). In contrast, the second refresh frame is provided after a frame in which the reversal driving technique has been set to the column-reversal driving (e.g., twenty-first frame in FIG. 16) and after a frame in which the reversal driving technique has been set to the two-dot-reversal driving (e.g., twelfth frame in FIG. 16). It is to be noted that the second refresh frame is also provided after a frame in which the image has changed. Specifically, even when a frame is one in which the reversal driving technique has been set to the dot-reversal driving, the second refresh frame is provided after this frame when the image has changed as compared to the previous refresh frame.

As described above, in the configuration where the reversal driving technique is switched among three or more techniques, the reversal driving control portion 10 sets the first input frame (frame in which the image signal DAT is inputted from the external portion without outputting the request signal RO) to a refresh frame, and decides the reversal driving technique in the first input frame based on the count value Cnt such that the frequency of spatial polarity reversal of the liquid crystal applied voltage gradually becomes higher in stages as the count value Cnt becomes larger. Further, when a frame, in which a reversal driving technique other than a technique with the highest frequency of the spatial polarity reversal of the liquid crystal applied voltage is employed out of a plurality of previously prepared reversal driving techniques, among the first input frames, and a frame, in which an image based on the image signal DAT has changed as compared to the previous refresh frame, are defined as first refresh frames, the reversal driving control portion 10 sets n frames (n is a set value of the register REFINT) subsequent to the first refresh frame to pause frames, sets a frame subsequent to the final pause frame to a second refresh frame, and sets the reversal driving technique in the second refresh frame to the technique with the highest frequency of the spatial polarity reversal of the liquid crystal applied voltage out of the plurality of reversal driving techniques. More precisely switching the reversal driving technique as above allows more effective suppression of an increase in consumption power.

Further, in the example shown in FIG. 16, three potentials, "VCOM1", "VCOM2", and "VCOM3", are prepared as potentials of the common electrode 33. "VCOM1", "VCOM2", and "VCOM3" are potentials different from one another. When the dot-reversal driving is performed, the common electrode potential is set to VCOM1. When the 2-dot-reversal driving is performed, the common electrode potential is set to VCOM2. When the column-reversal driving is performed, the common electrode potential is set to VCOM3. As thus described, the common electrode potential is set in accordance with the reversal driving technique used for driving of the liquid crystal panel 300. Accordingly, even when the optimum common electrode potential is different with respect to each reversal driving technique, it is possible to suppress deterioration in liquid crystal.

2. Second Embodiment

2.1 Configuration, Etc.

A second embodiment of the present invention will be described. The whole configuration and an operation of the liquid crystal display device, a configuration and an operation of the driver control portion 100 are similar to those in the first embodiment, and descriptions thereof will thus be omitted (see FIGS. 1 and 2).

2.2 Method for Deciding Refresh Frame and Method for Deciding Reversal Driving Technique Next, concerning a method for deciding a refresh frame and a method for deciding a reversal driving technique, points in difference from the first embodiment will be described. In the first embodiment, after the frame in which the column-reversal driving has been performed and the frame in which the image has changed, the refresh frame (second refresh frame) in which the reversal driving technique is the dot-reversal driving is provided with a pause frame put between the refresh frames. In contrast, in the present embodiment, the second refresh frame is not provided after the frame in which the column-reversal driving has been performed, and is not provided after the frame in which the image has changed. It should be noted that the second refresh frame may be provided only after either the frame in which the column-reversal driving has been performed or the frame in which the image has changed.

2.3 Concrete Example

Next, with reference to FIG. 17, a concrete example of the driving in the present embodiment will be described. The first frame is a refresh frame in which the reversal driving technique is the column-reversal driving. Thereafter, the image signal DAT is inputted in the sixth frame without the second refresh frame being provided. At this time, the number of times (six times in the present embodiment) of pause frames set by the register SWTH have not been generated since the previous refresh frame, and hence the sixth frame becomes a refresh frame in which the reversal driving technique is the column-reversal driving.

Thereafter, the image signal DAT is inputted in the fourteenth frame without the second refresh frame being provided. At this time, the number of times of pause frames set by the register SWTH have been generated since the previous refresh frame, and hence the fourteenth frame becomes a refresh frame in which the reversal driving technique is the dot-reversal driving.

Thereafter, the number of times (nine times in the present embodiment) of pause frames (the fifteenth to twenty-third frames) set by the register NREF have been generated without input of the image signal DAT, and hence the request signal RO is outputted to the external portion (host) in the final pause frame (the twenty-third frame). Then, the image signal DAT is inputted from the external portion in the twenty-fourth frame. At this time, the number of times of pause frames set by the register SWTH have been generated since the previous refresh frame, and hence the twenty-fourth frame becomes a refresh frame in which the reversal driving technique is the dot-reversal driving. The twenty-ninth frame becomes a refresh frame in which the reversal driving technique is the column-reversal driving for a similar reason to the sixth frame.

2.4 Modified Example

Incidentally, in the second embodiment, in a case where the image signal DAT is inputted every time the number of times of pause frames close to the threshold (setting value of the register SWTH) TH are generated, the effect being the object of the present invention may not be obtained. For example, when the threshold TH is "6" and the number of times of pause frames between the first input frames alternately changes between "5" and "7", the column-reversal driving is performed in the first input frame subsequent to five times of pause frames, and the dot-reversal driving is performed in the first input frame subsequent to seven times of pause frames, as shown in FIG. 18. At this time, the state where writing by the column-reversal driving has been performed continues in eight frames (including a refresh frame), and the state where writing by the dot-reversal driving has been performed continues in six frames (including a refresh frame). That is, the state where writing by the column-reversal driving has been performed is held in a longer period than the state where writing by the dot-reversal driving has been performed. However, it is originally preferable that the dot-reversal driving is employed as the reversal driving technique in a refresh frame when a period of pause frames since that refresh frame is long, and that the column-reversal driving is employed as the reversal driving technique in a refresh frame when the period of pause frames since that refresh frame is short Therefore, in the present modified example, a threshold (hereinafter referred to as "first switching threshold") for determining whether or not a switching is made from the column-reversal driving to the dot-reversal driving is prepared and a threshold (hereinafter referred to as "second switching threshold") for determining whether or not a switching is made from the dot-reversal driving to the column-reversal driving is prepared. In a case where the column-reversal driving has been performed in the previous refresh frame, when the number of times of pause frames not smaller than the first switching threshold have been generated since the previous refresh frame, the reversal driving technique in this time's refresh frame (first input frame) is set to the dot-reversal driving, and when only the number of times of pause frames smaller than the first switching threshold have been generated since the previous refresh frame, the reversal driving technique in this time's refresh frame (first input frame) is set to the column-reversal driving. In a case where the dot-reversal driving has been performed in the previous refresh frame, when only the number of times of pause frames smaller than the second switching threshold have been generated since the previous refresh frame, the reversal driving technique in this time's refresh frame (first input frame) is set to the column-reversal driving, and when the number of times of pause frames not smaller than the second switching threshold have been generated since the previous refresh frame, the reversal driving technique in this time's refresh frame (first input frame) is set to the dot-reversal driving. It is to be noted that the presence or absence of the change in image does not affect decision of the reversal driving technique.

Here, a concrete example of driving in the present modified example will be described with reference to FIG. 19. It should be noted that it is assumed that the first switching threshold is set to "6", and the second switching threshold is set to "4". The first frame is a refresh frame in which the reversal driving technique is the dot-reversal driving. Thereafter, the image signal DAT is inputted in the seventh frame, the fifteenth frame, the twenty-first frame, and the twenty-ninth frame. In any of the seventh frame, the fifteenth frame, the twenty-first frame, and the twenty-ninth frame, the number of times of pause frames not smaller than the second switching threshold have been generated since the previous refresh frame. Therefore, the reversal driving technique in each of the seventh frame, the fifteenth frame, the twenty-first frame, and the twenty-ninth frame is set to the dot-reversal driving. Thereafter, the image signal DAT is inputted in the thirty-third frame. At this time, only the number of times of pause frames smaller than the second switching threshold have been generated since the previous refresh frame, and hence the reversal driving technique in the thirty-third frame is set to the column-reversal driving.

Thereafter, the image signal DAT is inputted in the thirty-ninth frame, the forty-third frame, and the forty-ninth frame. In any of the thirty-ninth frame, the forty-third frame, and the forty-ninth frame, only the number of times of pause frames smaller than the first switching threshold have been generated since the previous refresh frame. Therefore, the reversal driving technique in each of the thirty-ninth frame, the forty-third frame, and the forty-ninth frame is set to the column-reversal driving. Thereafter, the image signal DAT is inputted in the fifty-seventh frame. At this time, the number of times of pause frames not smaller than the first switching threshold have been generated since the previous refresh frame, and hence the reversal driving technique in the fifty-seventh frame is set to the dot-reversal driving.

According to the present modified example, in the liquid crystal display device for performing the pause driving, it is possible to effectively suppress occurrence of flicker while suppressing an increase in power consumption even when the image signal DAT is inputted every time a pause frame is generated the number of times close to the threshold.

3. Others

3.1 About Reversal Driving Technique

In the each of the above embodiments, the reversal driving technique is switched between the column-reversal driving and the dot-reversal driving. However, the present invention is not limited to this. For example, assuming "p>q", the configuration may be such that "when the number of times of pause frames since the previous refresh frame is not smaller than a previously set threshold, a refresh by q-dot-reversal driving is performed, and when the number of times of pause frames since the previous refresh frame is smaller than the threshold, a refresh by p-dot-reversal driving is performed" as to the first input frame. In this case, the p-dot-reversal driving corresponds to the first reversal driving technique, and a q-dot-reversal driving corresponds to the second reversal driving technique. Further, the configuration may be such that "when the number of times of pause frames since the previous refresh frame is not smaller than a previously set threshold, a refresh by multi-dot-reversal driving is performed, and when the number of times of pause frames since the previous refresh frame is smaller than the threshold, a refresh by the column-reversal driving is performed", as to the first input frame. In this case, the column-reversal driving corresponds to the first reversal driving technique, and the multi-dot-reversal driving corresponds to the second reversal driving technique. As described above, the two employed reversal driving techniques are not particularly limited. Further, also in the case of switching the reversal driving technique among three or more techniques as in the modified example of the first embodiment, the three or more reversal driving techniques to be employed are not particularly limited.

3.2 About Comparison with Threshold

In each of the above embodiments, the reversal driving technique in the first input frame is decided by comparing the number of times of pause frames since the previous refresh frame with the previously set threshold. However, the present invention is not limited to this. For example, the configuration may be such that the reversal driving technique in the first input frame is decided by comparing an average value of the number of times of pause frames between a refresh frame and a refresh frame in a certain predetermined period with a previously set threshold. Accordingly, the reversal driving technique is decided based on an average frequency of input of the image signal in the predetermined period, to suppress deterioration in display quality due to an abrupt change or a sudden change.

DESCRIPTION OF REFERENCE CHARACTERS

10: REVERSAL DRIVING CONTROL PORTION
12: REGISTER GROUP
22: SOURCE DRIVER
24: GATE DRIVER
30: DISPLAY PORTION
31: TFT (THIN FILM TRANSISTOR)
32: PIXEL ELECTRODE
33: COMMON ELECTRODE
100: DRIVER CONTROL PORTION
102: PAUSE FRAME COUNTING PORTION
104: COMPARISON PORTION
106: REVERSAL DRIVING TECHNIQUE DECIDING PORTION
200: PANEL DRIVING PORTION
300: LIQUID CRYSTAL PANEL

The invention claimed is:

1. A liquid crystal display device, which employs pause driving to provide a pause frame for suspending a refresh of a screen between two refresh frames for performing a refresh of the screen, and performs image display by applying an AC voltage to liquid crystal based on an image signal irregularly inputted from an external portion, the liquid crystal display device comprising:

a liquid crystal panel that includes a plurality of pixel electrodes arranged in a matrix form and a common electrode provided for applying a voltage between the common electrode and the plurality of pixel electrodes through the liquid crystal, and displays an image based on the image signal;

a liquid crystal panel driving portion that drives the liquid crystal panel; and a reversal driving control portion that includes a pause frame counting portion for counting as a count value the number of times of pause frames since generation of a refresh frame until generation of the next refresh frame, receives the image signal, decides which of a refresh frame or a pause frame each frame is set to, and decides a reversal driving technique for applying an AC voltage to the liquid crystal, to control an operation of the liquid crystal panel driving portion, wherein, when a frame in which the image signal is inputted from the external portion without requesting the external portion to input the image signal is defined as a first input frame, the reversal driving control portion sets the first input frame to a refresh frame, and decides the reversal driving technique in the first input frame based on the count value such that the frequency of spatial polarity reversal of a liquid crystal applied voltage gradually becomes higher as the count value becomes larger.

2. The liquid crystal display device according to claim 1, wherein when a frame in which a reversal driving technique other than a technique with the highest frequency of the spatial polarity reversal of the liquid crystal applied voltage is employed out of a plurality of previously prepared reversal driving techniques, among the first input frames, is defined as a first refresh frame, the reversal driving control portion sets n (n is an integer not smaller than 1) frames subsequent to the first refresh frame to pause frames, sets a frame subsequent to the final pause frame to a refresh frame that is defined as a second refresh frame, and sets the reversal driving technique in the second refresh frame to a technique with the highest frequency of the spatial polarity reversal of the liquid crystal applied voltage out of the plurality of reversal driving techniques.

3. The liquid crystal display device according to claim 2, wherein the second refresh frame is made up of a plurality of frames.

4. The liquid crystal display device according to claim 1, wherein when a frame in which an image based on the image signal changes as compared to the previous refresh frame is defined as a first refresh frame, the reversal driving control portion sets n (n is an integer not smaller than 1) frames subsequent to the first refresh frame to pause frames, sets a frame subsequent to the final pause frame to a refresh frame that is defined as a second refresh frame, and sets the reversal driving technique in the second refresh frame to a technique with the highest frequency of the spatial polarity reversal of the liquid crystal applied voltage out of the plurality of reversal driving techniques.

5. The liquid crystal display device according to claim 1, wherein when a frame, in which a reversal driving technique other than a technique with the highest frequency of the spatial polarity reversal of the liquid crystal applied voltage is employed out of a plurality of previously prepared reversal driving techniques, among the first input frames and a frame in which an image based on the image signal changes as compared to the previous refresh frame, are defined as first refresh frames, the reversal driving control portion sets n (n is an integer not smaller than 1) frames subsequent to the first refresh frame to pause frames, sets a frame subsequent to the final pause frame to a refresh frame that is defined as a second refresh frame, and sets the reversal driving technique in the second refresh frame to the technique with the highest frequency of the spatial polarity reversal of the liquid crystal applied voltage out of the plurality of reversal driving techniques.

6. The liquid crystal display device according to claim 1, wherein a potential of the common electrode is set in accordance with the reversal driving technique that is used when the liquid crystal panel is driven.

7. The liquid crystal display device according to claim 1, wherein the reversal driving control portion requests the external portion to input the image signal when the image signal is not inputted through a period corresponding to a previously set number of frames.

8. The liquid crystal display device according to claim 7, wherein, when a frame in which the image signal is inputted from the external portion by requesting the external portion to input the image signal is defined as a second input frame, the reversal driving control portion sets the second input frame to a refresh frame, and sets the reversal driving technique in the second input frame to a technique with the highest frequency of the spatial polarity reversal of the liquid crystal applied voltage out of the plurality of reversal driving techniques.

9. The liquid crystal display device according to claim 1, wherein the reversal driving control portion sets the reversal driving technique in each refresh frame to either a first reversal driving technique with a relatively low frequency of the spatial polarity reversal of the liquid crystal applied voltage or a second reversal driving technique with a relatively high frequency of the spatial polarity reversal of the liquid crystal applied voltage.

10. The liquid crystal display device according to claim 9, wherein the first reversal driving technique is a column-reversal driving technique, and the second reversal driving technique is a dot-reversal driving technique.

11. The liquid crystal display device according to claim 9, wherein a first switching threshold which is to be compared with the count value at the time of deciding whether or not to switch the reversal driving technique from the first reversal driving technique to the second reversal driving technique and a second switching threshold which is to be compared with the count value at the time of deciding whether or not to switch the reversal driving technique from the second reversal driving technique to the first reversal driving technique are previously prepared, the second switching threshold being a smaller value than the first switching threshold, when the reversal driving technique in the previous refresh frame is the first reversal driving technique, the reversal driving control portion decides the reversal driving technique in the first input frame based on a result of comparison between the count value and the first switching threshold, and when the reversal driving technique in the previous refresh frame is the second reversal driving technique, the reversal driving control portion decides the reversal driving technique in the first input frame based on a result of comparison between the count value and the second switching threshold.

12. The liquid crystal display device according to claim 1, wherein the liquid crystal panel includes a scanning signal line, a video signal line which is applied with a video signal in accordance with the image signal, and a thin film transistor where a control terminal is connected to the scanning signal line, a first conduction terminal is connected to the video signal line, a second conduction terminal is connected to the pixel electrode, and a channel layer is formed of an oxide semiconductor.

13. The liquid crystal display device according to claim 12, wherein the oxide semiconductor is indium gallium zinc oxide mainly composed of indium (In), gallium (Ga), zinc (Zn), and oxygen (O).

14. A driving method of a liquid crystal display device, which employs pause driving to provide a pause frame for suspending a refresh of a screen between two refresh frames for performing a refresh of the screen, and performs image display by applying an AC voltage to liquid crystal based on an image signal irregularly inputted from an external portion, the driving method comprising:

a liquid crystal panel driving step of driving a liquid crystal panel that includes a plurality of pixel electrodes arranged in a matrix form and a common electrode provided for applying a voltage between the common electrode and the plurality of pixel electrodes through the liquid crystal, and displays an image based on the image signal; and a reversal driving control step of including a pause frame counting step of counting as a count value the number of tines of pause frames since generation of a refresh frame until generation of the next refresh frame, receiving the image signal, deciding which of a refresh frame or a pause frame each frame is set to; and deciding a reversal driving technique for applying an AC voltage to the liquid crystal, to control an operation in the liquid crystal panel driving step, wherein, when a frame in which the image signal is inputted from the external portion without requesting the external portion to input the image signal is defined as a first input frame, in the reversal driving control step, the first input frame is set to a refresh frame, and the reversal driving technique in the first input frame is decided based on the count value such that the frequency of spatial polarity reversal of a liquid crystal applied voltage gradually becomes higher as the count value becomes larger.

* * * * *